(12) United States Patent
Matsumoto et al.

(10) Patent No.: US 11,047,291 B2
(45) Date of Patent: Jun. 29, 2021

(54) ENGINE COOLING DEVICE AND ENGINE SYSTEM

(71) Applicant: Komatsu Ltd., Tokyo (JP)

(72) Inventors: Kazuya Matsumoto, Tokyo (JP); Makoto Nobayashi, Tokyo (JP); Yasuhiro Kamoshida, Tokyo (JP); Makoto Watanabe, Tokyo (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 16/649,724

(22) PCT Filed: Aug. 7, 2019

(86) PCT No.: PCT/JP2019/031034
§ 371 (c)(1),
(2) Date: Mar. 23, 2020

(87) PCT Pub. No.: WO2019/235651
PCT Pub. Date: Dec. 12, 2019

(65) Prior Publication Data
US 2021/0040878 A1     Feb. 11, 2021

(51) Int. Cl.
*F01P 7/14*     (2006.01)
*F01P 5/10*     (2006.01)
(Continued)

(52) U.S. Cl.
CPC .............. *F01P 7/14* (2013.01); *F01P 3/18* (2013.01); *F01P 5/10* (2013.01); *F01P 7/16* (2013.01);
(Continued)

(58) Field of Classification Search
CPC ........ F01P 7/14; F01P 3/18; F01P 5/19; F01P 2007/146; F01P 2060/04; F02M 26/22
See application file for complete search history.

(56) References Cited

U.S. PATENT DOCUMENTS

| 4,748,941 | A | 6/1988 | Kashiwase |
| 10,815,867 | B2 * | 10/2020 | Kim .................... F01P 7/14 |

(Continued)

FOREIGN PATENT DOCUMENTS

| CN | 101718217 A | 6/2010 |
| CN | 205349500 U | 6/2016 |

(Continued)

OTHER PUBLICATIONS

International Search Report dated Oct. 8, 2019, issued for PCT/JP2019/031034 and English translation thereof.

(Continued)

*Primary Examiner* — Jacob M Amick
(74) *Attorney, Agent, or Firm* — Locke Lord LLP

(57) ABSTRACT

An engine cooling device includes: a flow path switching unit provided between an engine and an EGR cooler and the radiator and between the engine and the EGR cooler and a pump. The flow path switching unit includes a first valve that allows a cooling water to flow through a first bypass flow path extending toward the pump when a temperature of the cooling water is lower than a first temperature and that allows the cooling water to flow through a radiator connection flow path, a second valve that allows the cooling water to flow through the first bypass flow path when the temperature of the cooling water is less than a second temperature that is higher than the first temperature, and allows the cooling water to flow through the radiator connection flow path when the temperature of the cooling water is equal to or higher than the second temperature.

6 Claims, 6 Drawing Sheets

(51) Int. Cl.
*F02M 26/22* (2016.01)
*F01P 3/18* (2006.01)
*F01P 7/16* (2006.01)

(52) U.S. Cl.
CPC ....... *F02M 26/22* (2016.02); *F01P 2007/146* (2013.01); *F01P 2060/04* (2013.01)

(56) References Cited

U.S. PATENT DOCUMENTS

| | | | | |
|---|---|---|---|---|
| 2007/0157893 | A1* | 7/2007 | Wei | F01P 3/02 |
| | | | | 123/41.08 |
| 2013/0213600 | A1* | 8/2013 | Saitoh | F01P 7/16 |
| | | | | 165/11.1 |
| 2013/0269663 | A1* | 10/2013 | Nishiyama | F02B 29/0443 |
| | | | | 123/568.12 |
| 2019/0120178 | A1* | 4/2019 | Park | F02D 41/0077 |

FOREIGN PATENT DOCUMENTS

| | | |
|---|---|---|
| CN | 109072760 A | 12/2018 |
| JP | 55-044072 U | 3/1980 |
| JP | 60-004715 U | 1/1985 |
| JP | 11-218024 A | 8/1999 |
| JP | 4736843 B2 | 7/2011 |
| JP | 2019-035371 A | 3/2019 |
| JP | 2019-086132 A | 6/2019 |
| WO | 2018/164285 A1 | 9/2018 |

OTHER PUBLICATIONS

International Search Report dated Oct. 18, 2019, issued for PCT/JP2019/031034 and English translation thereof.

* cited by examiner

ENGINE COOLING DEVICE AND ENGINE SYSTEM

TECHNICAL FIELD

The present invention relates to an engine cooling device and an engine system.

BACKGROUND TECHNOLOGY

Patent Document 1 discloses an engine cooling device including a valve (thermostat) for switching a circulation path of a cooling water in accordance with a temperature of a cooling water. In the engine cooling device of the Patent Document 1, the valve is closed during a warm-up operation of the engine (when a cooling water is lower than a predetermined temperature), the cooling water is circulated between the pump and engine, and the valve is opened when the warm-up operation is ended (when cooling water becomes equal to or higher than the predetermined temperature), thereby sequentially circulating the cooling water to the pump, the engine, and a radiator.

PRIOR ART DOCUMENT

Patent Document

Patent Document 1: Japanese Unexamined Patent Application Publication No. H11-218024

SUMMARY OF THE INVENTION

Problems to be Solved by the Invention

In an engine system including an engine and the above-described engine cooling device, there is a system configured to a manner such that part of an exhaust gas discharged from the engine used as an EGR gas (exhaust gas re-circulation gas) is mixed with an outside air to return to the engine, thereby reducing NOx in the exhaust gas. An engine system of this type includes an EGR cooler for cooling the EGR gas. The engine cooling device is also configured to provide cooling water from the pump to both the engine and the EGR cooler.

However, in the warm-up operation of the engine, since cooling water is not circulated to radiator, the pressure of the cooling water tends to rise in proportion to the temperature rise of the cooling water. Since the durability (pressure resistance) of the EGR cooler against the pressure of cooling water is lower than the durability of the engine in many cases, it is not preferable that the pressure of cooling water increases.

It is also conceivable to suppress the pressure rise in the cooling water by opening, the valve at a low temperature and circulating the cooling water to the radiator. In this case, however, there is a problem that the engine is less likely to warm up, and the warm-up operation of the engine becomes long.

The present invention has been made in view of such a problem, and the present invention is objected to provide an engine cooling device which protects an EGR cooler and which is capable of suppressing the time from being long in a warm-up operation of the engine, and an engine system provided with the engine cooling device.

Means for Solving the Problem

An engine cooling device according to an aspect of the present invention includes: a pump that supplies a cooling water from a discharge port of the pump to an engine and an EGR cooler; a radiator that cools the cooling water from the engine and the EGR cooler, an outlet of the cooling water in the radiator being connected to a suction port of the pump; a flow path switching, unit that is provided in a middle of a flow path of the cooling water from the engine and the EGR cooler toward the radiator; a radiator connection flow path that connects the flow path switching unit and the radiator; and a first bypass flow path that connects the flow path switching unit and the suction port of the pump. The flow path switching unit includes: a first valve that allows the cooling water to flow through the first bypass flow path when a temperature of the cooling water is lower than a first predetermined temperature and allows the cooling water to flow through the radiator connection flow path when the temperature of the cooling water is equal to or higher than the first predetermined temperature; and a second valve that allows the cooling water to flow through the first bypass flow path when the temperature of the cooling water is lower than the second predetermined temperature that is higher than the first predetermined temperature and allows the cooling water to flow through the radiator connection flow path when the temperature of the cooling water is equal to or higher than the second predetermined temperature. The number of the first valves is less than the number of the second valves.

An engine system according to an aspect of the present invention includes an engine, an EGR cooler, and the engine cooling device.

Effect of Invention

According to the present invention, protection of the EGR cooler can be achieved and it is possible to suppress the time from being long in a warm-up operation of the engine.

MODE FOR CARRYING OUT THE INVENTION

<Engine System>

Hereinafter, the embodiment of the present invention will be described in detail with reference to FIG. 1 to FIG. 6. The engine system according to the present embodiment is mounted on an arbitrary work vehicle, for example, dump truck, wheel loader, motor grader, or the like.

Figure 1:
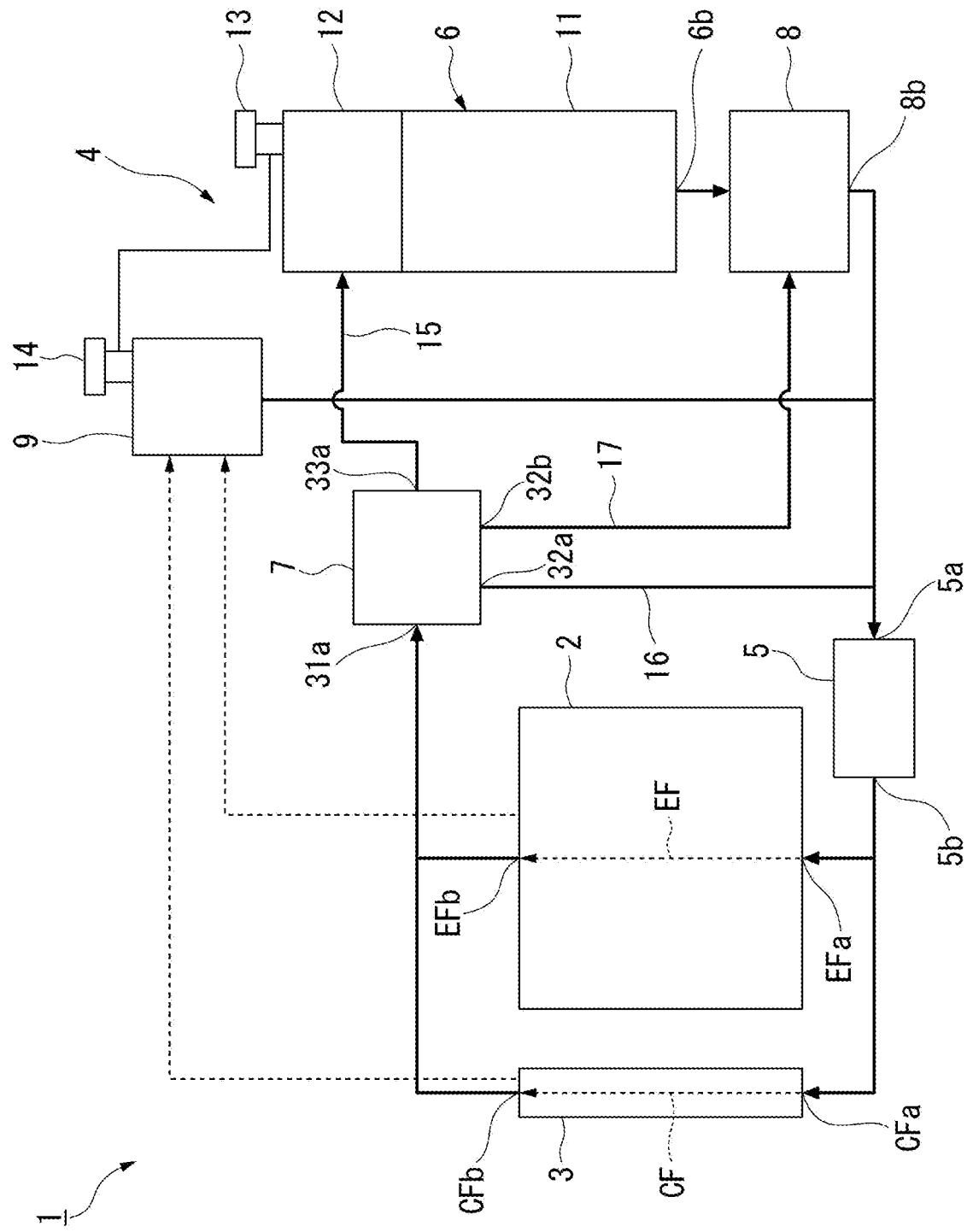
FIG. 1 is a schematic configuration diagram showing an engine system according to an embodiment of present invention.

As shown in FIG. 1, the engine system 1 includes an engine 2, an EGR cooler 3, and an engine cooling device 4 for cooling the engine 2 and the EGR cooler 3 by a cooling water. The arrows in FIG. 1 indicate the direction in which the cooling water flows in the engine system 1.

<Engine>

The engine 2 includes a cylinder, a cylinder block, a cylinder head, and the like. The cylinder head and the cylinder block are provided with a first cooling flow path EF through which the cooling water flows. The engine 2 is cooled by the cooling water flowing in the first cooling flow path EF.

<EGR Cooler>

The EGR cooler 3 cools the EGR gas which is part of an exhaust gas discharged from the engine 2. The EGR cooler 3 is provided with a second cooling flow path CF through which the cooling water flows. The EGR gas passing through the EGR cooler 3 is cooled by exchanging heat with the cooling water flowing to the second cooling flow path CF.

<Engine Cooling Device>

The engine cooling device 4 includes a pump 5, a radiator 6, and a flow path switching unit 7. The engine cooling device 4 of the present embodiment further includes an oil cooler 8. The engine cooling device 4 of the present embodiment further includes a defoaming tank 9.

<Pump>

The pump 5 supplies a cooling water from a discharge port 5b of the pump to the engine 2 and the EGR cooler 3. The discharge port 5b of the pump 5 is connected to an inlet EFa of the first cooling flow path EF of the engine 2 and to an inlet CFa of the second cooling flow path CF of the EGR cooler 3, The pump 5 is driven by a power of the engine 2. The pump 5 is always operated while the engine 2 is driven.

<Radiator>

The radiator 6 cools the cooling water which has become high temperature by performing heat exchange between the outside air and the cooling water that flows in the first cooling flow path EF of the engine 2 and the second cooling flow path CF of the EGR cooler 3 and that has been heated by the engine 2 and the EGR cooler 3.

An outlet 6b of the cooling water in the radiator 6 is connected to the suction port 5a of the pump 5. That is, the cooling water cooled in the radiator 6 flows toward the pump 5. The outlet 6b of the cooling water in the radiator 6 may be directly connected to the suction port 5a of the pump 5, for example, but is connected to the suction port 5a of the pump 5 via an oil cooler 8 which will be described later in the present embodiment.

The radiator 6 includes a core 11 and an upper tank 12. The core 11 performs heat exchange between the cooling water and the outside air. Specifically, the heat exchange is performed between the cooling water flowing in a tube (not shown) of the core 11 and the outside air around the tube. The upper tank 12 is provided on an upper side of the core 11, stores the cooling water flowing from the engine 2 and the EGR cooler 3, and supplies it to the core 11. A radiator cap 13 is detachably provided in the upper tank 12. By removing the radiator cap 13, the cooling water can be supplied to the upper tank 12 from an outside of a circulation path of the cooling water in the engine cooling device 4.

<Oil Cooler>

The oil cooler 8 cools a brake oil used for the brake of the work vehicle. The oil cooler 8 is connected to the outlet 6b of the cooling water in the radiator 6. As a result, the cooling water from the radiator 6 passes through the oil cooler 8, and the brake oil can be cooled by performing heat exchange between the cooling water and the brake oil. The outlet 8b of the cooling water in the oil cooler 8 is connected to the suction port 5a of the pump 5. As a result, the cooling water flows sequentially through the radiator 6 and the oil cooler 8 and then returns to the pump 5.

<Defoaming Tank>

The defoaming tank 9 is connected to the engine 2, the EGR cooler 3, and the upper tank 12. Further, the defoaming tank 9 is connected to the suction port 5a of the pump 5. The defoaming tank 9 collects the cooling water containing foam from the engine 2, the EGR cooler 3, and the upper tank 12, separates the foam from the cooling water, and removes the foam. The cooling water from which foam have been removed flows from the defoaming tank 9 to the pump 5. Since the defoaming tank 9 and the upper tank 12 are connected to each other, the pressure of the cooling water in the upper tank 12 and the defoaming tank 9 is kept uniform.

The defoaming tank 9 has a relief cap 14. The relief cap 14 opens when the pressure of the cooling water in the defoaming tank 9 and the circulation path of the cooling water connected thereto reaches a predetermined pressure, thereby preventing the pressure from becoming excessively high.

<Flow Path Switching Unit>

The flow path switching unit 7 is provided in the middle of a path of the cooling water from the engine 2 and the EGR cooler 3 toward the radiator 6, that is, between the engine 2 and the EGR cooler 3 and the radiator 6. A radiator connection flow path 15 is provided between the flow path switching unit 7 and the radiator 6 to connect them. A first bypass flow path 16 is provided between the flow path switching unit 7 and the pump 5 to connect them. Further, a second bypass flow path 17 is provided between the flow path switching unit 7 and the oil cooler 8 to connect them.

The flow path switching unit 7 switches the flow path of the cooling water so as to allow the cooling water from the engine 2 and the EGR cooler 3 to flow through one or both of the radiator connection flow path 15 and the first and second bypass flow paths 16 and 17.

Figure 2:
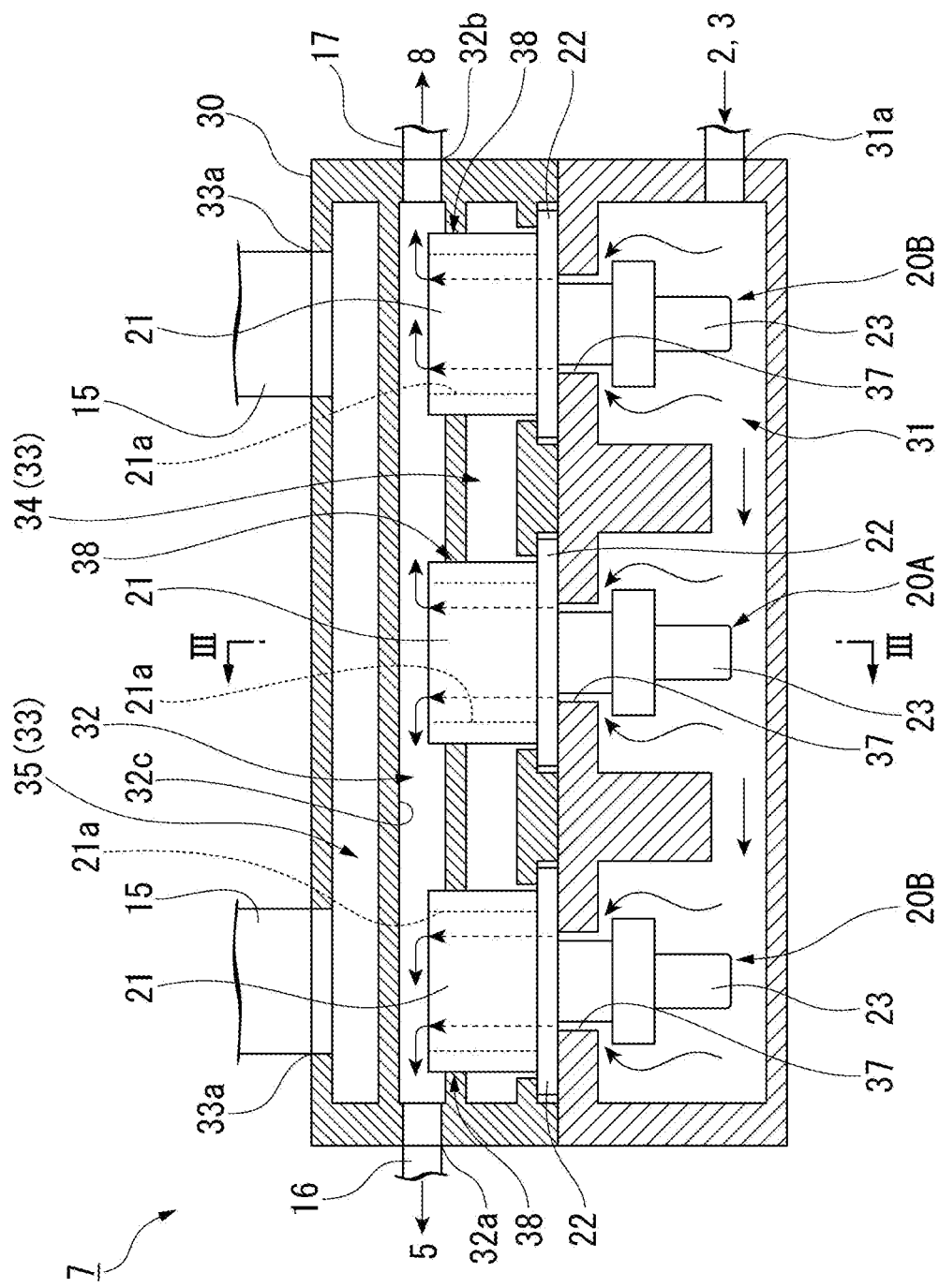
FIG. 2 is a cross-sectional view showing a state in which a first valve and second valves are closed in the flow path switching unit in the engine system according to the embodiment of the present invention.
Figure 3:
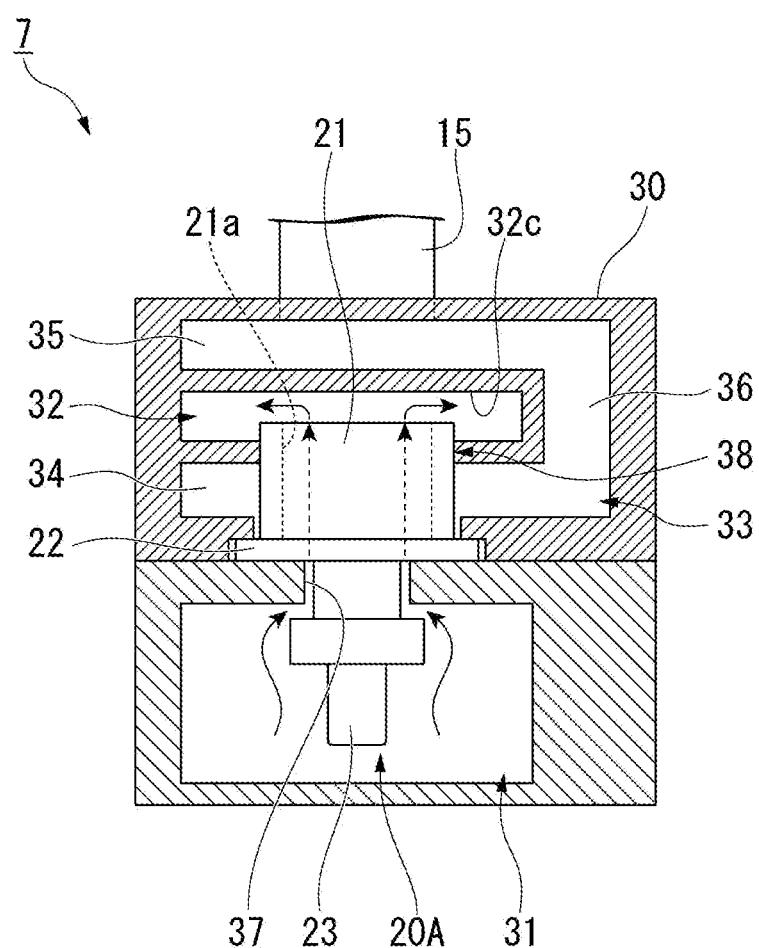
FIG. 3 is a cross-sectional view taken along the line in FIG. 2.

As shown in FIGS. 2 and 3, the flow path switching unit 7 includes a plurality of valves 20A and 20B, and a housing 30 for accommodating the plurality of valves 20A and 20B.

<Housing>

On an inside portion of the housing 30, an inflow-side flow path 31, a first outflow-side flow path 32, and a second outflow-side flow path 33 are formed. The inflow-side flow path 31 has an inlet 31a connected to outlets EFb, CFb (see FIG. 1) of the first cooling flow path EF of the engine 2 and the second cooling flow path CF of the EGR cooler 3.

The first outflow-side flow path 32 has a pump-side outflow port 32a for connecting the first bypass flow path 16 and an oil-cooler-side outflow port 32b for connecting the second bypass flow path 17. The pump-side outflow port 32a and the oil-cooler-side outflow port 32b are located at a distance from each other. In the present embodiment, the pump-side outflow port 32a and the oil-cooler-side outflow port 32b are located at the both ends of the first outflow-side flow path 32 (housing 30) in one direction (a lateral direction in FIG. 2).

The second outflow-side flow path 33 has a radiator-side outflow port 33a for connecting the radiator connection flow path 15. The number of radiator-side outflow ports 33a may be one, for example, but a plurality of outflow ports are provided in the present embodiment. The plurality of radiator-side outflow ports 33a are arranged at intervals in the lateral direction. In the housing 30 shown in FIG. 2, the number of radiator-side outflow ports 33a is two.

The inflow-side flow path 31, the first outflow-side flow path 32 and the second outflow-side flow path 33 may be relatively arranged so as to be able to be switched between a state in which the inflow-side flow path 31 and the first outflow-side flow path 32 communicate with each other and a state in which the inflow-side flow path 31 and the second outflow-side flow path 33 communicate with each other by the valves 20A and 20B which will be described later.

In the present embodiment, the inflow-side flow path 31, the second outflow-side flow path 33, and the first outflow-side flow path 32 are sequentially arranged from bottom in a vertical direction (vertical direction in FIGS. 2 and 3) intersecting in the lateral direction in which the pump-side outflow port 32a and the oil-cooler-side outflow port 32b are arranged. The second outflow-side flow path 33 is located on an upper side of the first outflow-side flow path 32 in the vertical direction. Specifically, as shown in FIG. 3, the second outflow-side flow path 33 includes a lower-side flow path portion 34 positioned below the first outflow-side flow path 32, an upper-side flow path portion 35 positioned above the first outflow-side flow path 32, and a connection flow path portion 36 positioned adjacent to the first outflow-side flow path 32 in a depth direction and connecting the lower-side flow path portion 34 and the upper-side flow path portion 35. The radiator-side outflow port 33a is opened into the upper-side flow path portion 35.

As shown in FIG. 2, the lower-side flow path portion 34 of the second outflow-side flow path 33 is connected to the inflow-side flow path 31 by a first hole 37 formed in the housing 30. A plurality (three in the present embodiment) of the first holes 37 are arranged at a distance in the lateral direction. Further, the lower-side flow path portion 34 of the second outflow-side flow path 33 is connected to the first outflow-side flow path 32 by a second hole 38 formed in the housing 30. A plurality (three in the present embodiment) of the second holes 38 are arranged at a distance from each other in the lateral direction so as to be positioned above each of the first holes 37. Center axial lines of the first hole 37 and the second hole 38 arranged in the vertical direction are coaxial. The first hole 37 and the second hole 38 are used for installation of the valves 20A and 20B to be described later.

<Valve>

Each of the valves 20A and 20B is a thermostat that operates in accordance with the temperature of the cooling water. When the temperature of the cooling water is lower than a predetermined temperature, the valves 20A and 20B communicate the inflow-side flow path 31 with the first outflow-side flow path 32 to allow the cooling water to flow through the first bypass flow path 16 and the second bypass flow path 17. In addition, when the temperature of the cooling water is equal to or higher than the predetermined temperature, each of the valves 20A and 20B communicates the inflow-side flow path 31 with the second outflow-side flow path 33 to allow the cooling water to flow through the radiator connection flow path 15.

Specifically, each of the valves 20A and 20B is disposed in the housing 30 at a position corresponding to the first hole 37 and the second hole 38 which are arranged in the vertical direction. Each of the valves 20A and 20B includes a valve body 21 formed in a cylindrical shape extending in the vertical direction, a flange 22 having an annular shape and projecting outward in a radial direction with respect to the valve body 21, and an actuator 23 for driving the valve body 21 in the vertical direction.

The valve body 21 has a through hole 21a extending in the vertical direction. The valve body 21 is inserted into the second hole 38, and is disposed so that an opening at a lower side of the valve body 21 faces the first hole 37. The valve body 21 is movable in the vertical direction.

The flange 22 is fixed to the housing 30 at a lower side of the valve body 21. The flange 22 is arranged so as to surround the first hole 37 on an inner surface side of the lower-side flow path portion 34 into which the first hole 37 is opened.

Figure 4:
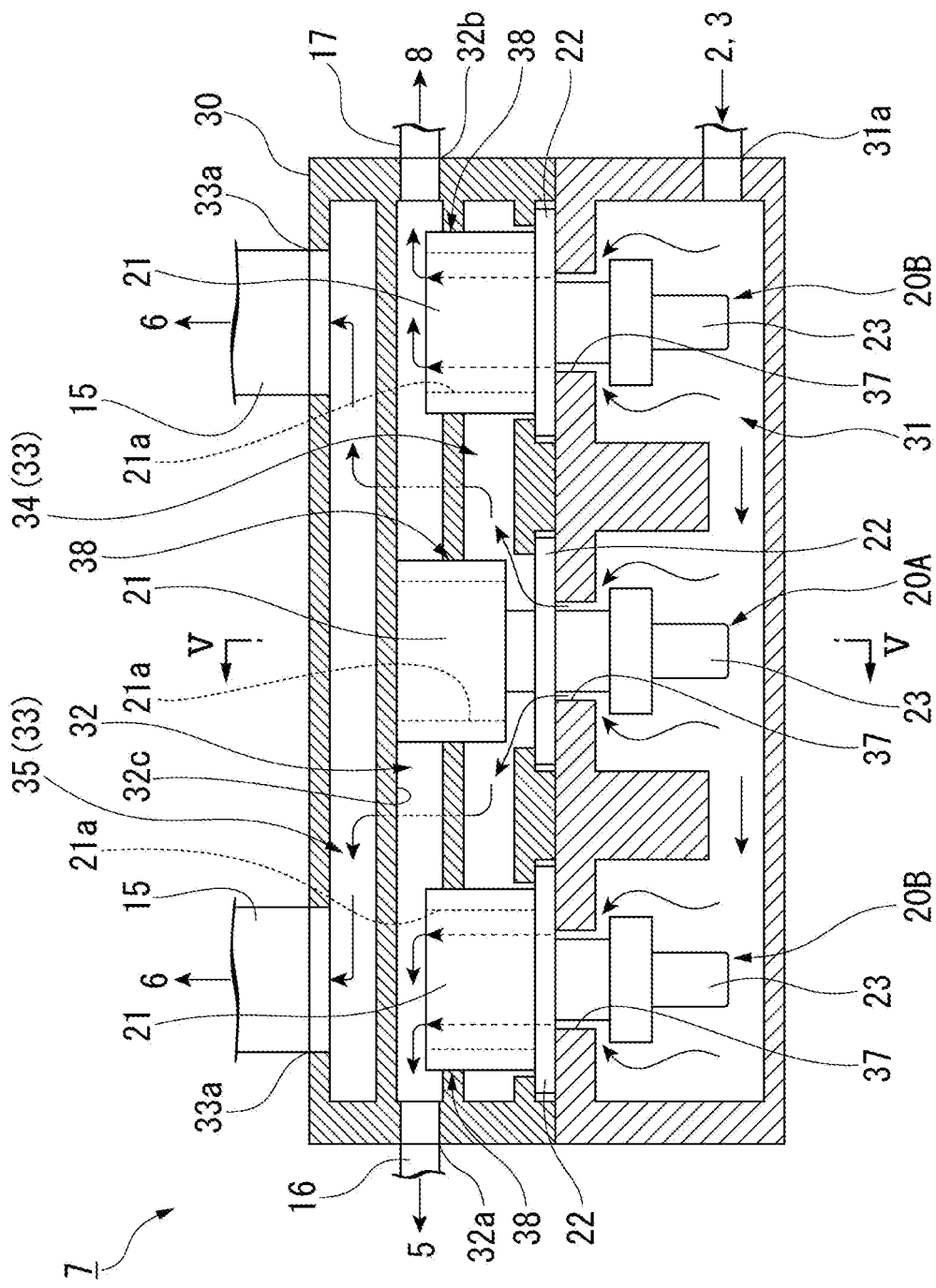
FIG. 4 is a cross-sectional view showing a state in which the first valve is opened and the second valves are closed in the flow path switching unit in the engine system according to the embodiment of the present invention.

When the temperature of the cooling water is lower than the predetermined temperature, the actuator 23 moves the valve bodies 21 of the valves 20A and 20B downward, as shown in FIGS. 2 to 4, so that a lower end of the valve bodies 21 is brought into contact with the flange 22. In this state, a clearance is formed between an upper end of the valve body 21 and a top surface 32c of the first outflow-side flow path 32, and the inflow-side flow path 31 is communicated with the first outflow-side flow path 32 through the first hole 37 and the through hole 21a of the valve body 21. Further, since the lower end of the valve body 21 is in contact with the flange 22, the inflow-side flow path 31 does not communicate with the second outflow-side flow path 33. In the following description, this state may be referred to as a state in which the valves 20A and 20B are closed.

Figure 5:
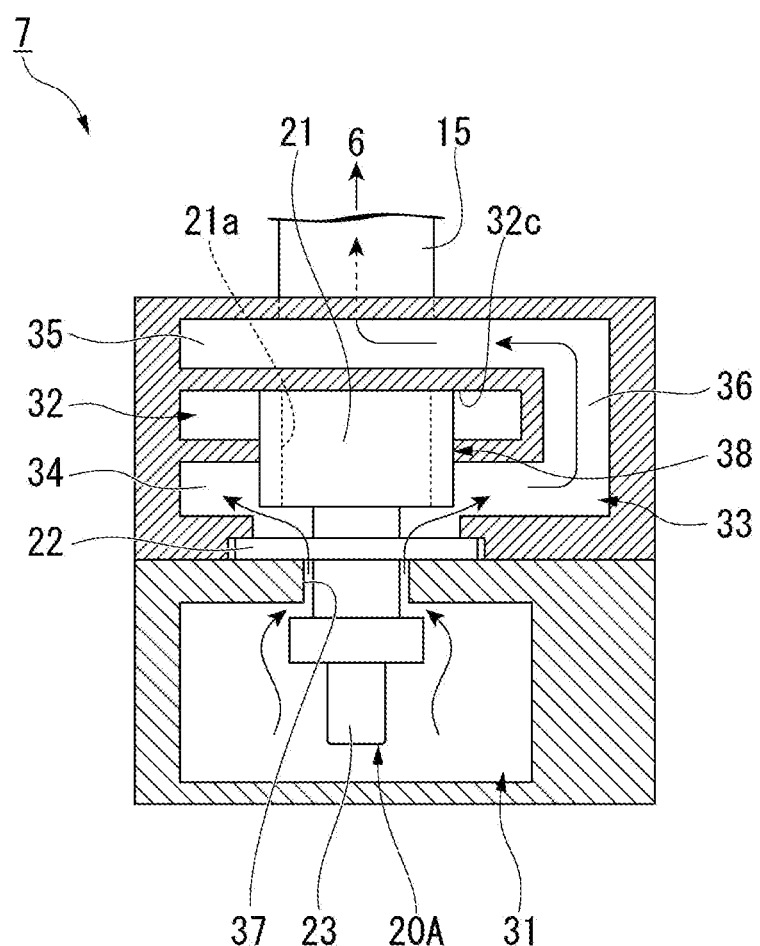
FIG. 5 is a cross-sectional view taken along the line V-V in FIG. 4.
Figure 6:
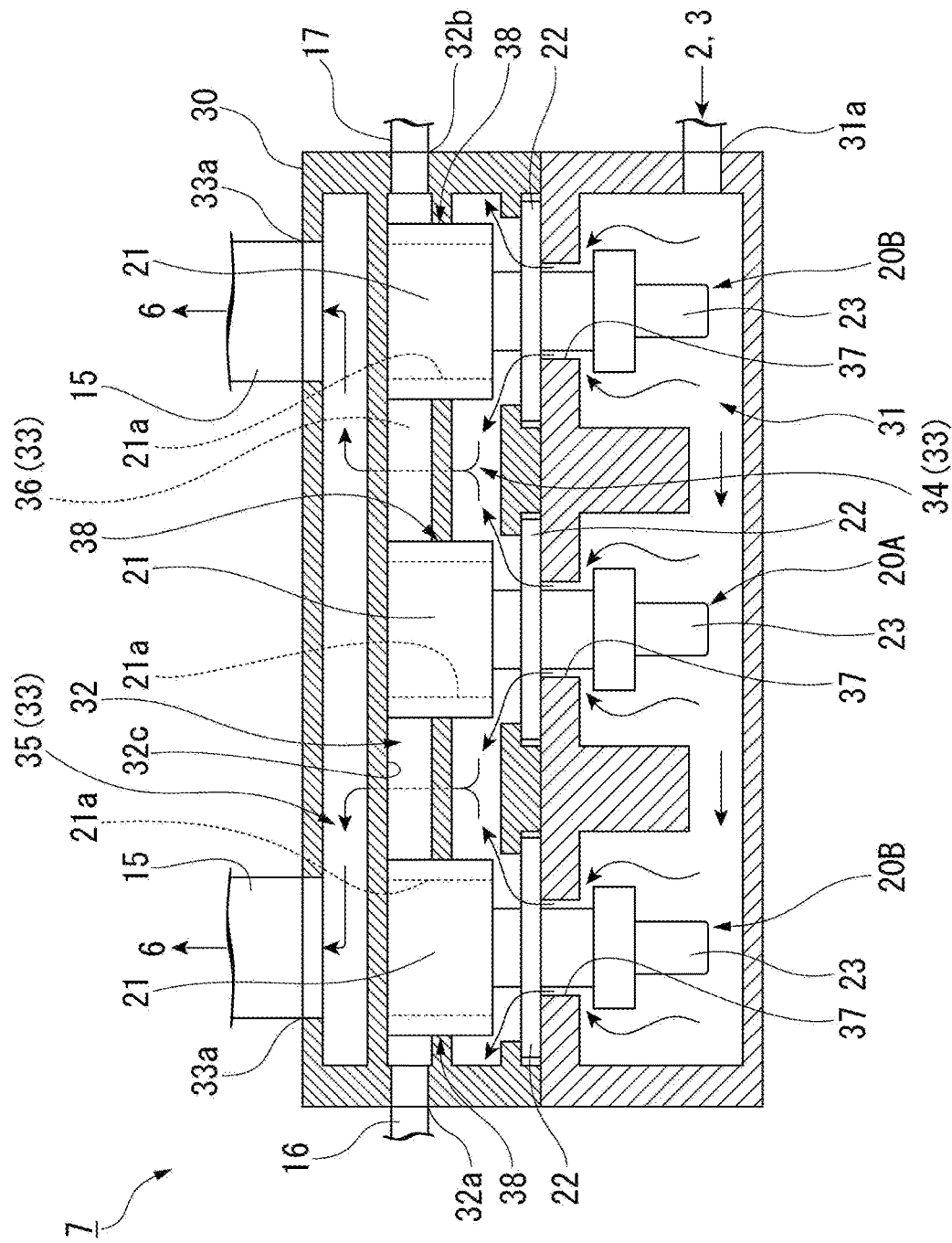
FIG. 6 is a sectional view showing a state in which the first valve and the second valves are opened in the flow path switching unit in the engine system according to the embodiment of the present invention.

When the temperature of the cooling water is equal to or higher than the predetermined temperature, the actuator 23 moves the valve bodies 21 of the valves 20A and 20B upward, as shown in FIGS. 4 to 6, so that the upper end of the valve bodies 21 is brought into contact with the top surface 32c of the first outflow-side flow path 32. In this state, a clearance is formed between the lower end of the valve body 21 and the flange 22, and the inflow-side flow path 31 communicates with the lower-side flow path portion 34 of the second outflow-side flow path 33 through the first hole 37. Further, since the upper end of the valve bodies 21 of the valves 20A and 20B is in contact with the top surface 32c of the first outflow-side flow path 32, the inflow-side flow path 31 does not communicate with the first outflow-side flow path 32. In the following description, this state may be referred to as a state in which the valves 20A and 20B arc opened.

As shown in FIGS. 2 to 6, the plurality of valves 20A and 20B include a first valve 20A that operates at a relatively low temperature and a second valve 20B that operates at a temperature higher than that of the first valve 20A.

As shown in FIGS. 2 and 3, when a temperature of the cooling water is less than a first predetermined temperature (hereinafter referred to as a first temperature), the first valve 20A communicates the inflow-side flow path 31 with the first outflow-side flow path 32, and causes the cooling water to flow through the first bypass flow path 16 and the second bypass flow path 17. Also, as shown in FIGS. 4 to 6, when the temperature of the cooling water is equal to or higher than the first temperature, the first valve 20A communicates the inflow-side flow path 31 with the second outflow-side flow path 33 and allows the cooling water to flow through the radiator connection flow path 15. On the other hand, as shown in FIGS. 2 and 4, when the temperature of the cooling water is less than a second predetermined temperature (hereinafter referred to as the second temperature) which is higher than the first temperature, the second valve 20B communicates the inflow-side flow path 31 with the first outflow-side flow path 32, and allows the cooling water to flow through the first bypass flow path 16 and the second bypass flow path 17. Further, as shown in FIG. 6, when the temperature of the cooling water is equal to or higher than the second temperature, the second valve 20B communicates the inflow-side flow path 31 with the second outflow-side flow path 33 and allows the cooling water to flow through the radiator connection flow path 15.

The number of the first valves 20A is smaller than the number of the second valves 20B. The specific number of the first valves 20A and the second valves 20B may be arbitrary. In the present embodiment, the number of the first valves 20A is one, and the number of the second valves 20B is two.

Also, the first valve 20A and the second valves 20B are arranged laterally between the pump-side outflow port 32a and the oil-cooler-side outflow port 32b so that the first valve 20A is disposed between the second valves 20B. That is, the second valves 20B are disposed on both sides of the first valve 20A in the lateral direction. The number of the second valves 20B disposed on both sides of the first valve 20A may be different from each other, but is more preferably equal to each other.

In the present embodiment, the plurality of the radiator-side outflow ports 33a formed in the housing 30 are disposed at positions where the distances from the first valve 20A to each of the radiator-side outflow ports 33a are equal to each other in the second outflow-side flow path 33. In the present embodiment, one first valve 20A is positioned in the middle between two radiator-side outflow ports 33a in the lateral direction. For example, when there are multiple first valves 20A, the plurality of the radiator-side outflow ports 33a only have to be disposed at positions where the distances from a valve group composed of the plurality of first valves 20A to each of the radiator-side outflow ports 33a are equal to each other.

OPERATION AND EFFECTS

In the engine cooling device 4 of the present embodiment, in a state in which the temperature of the cooling water is lower than the first temperature, both of the first valve 20A and the second valves 20B of the flow path switching unit 7 are closed as shown in FIGS. 2 and 3. That is, the valve bodies 21 of the first valve 20A and the second valves 20B are positioned on the lower side. Therefore, all the cooling water flowing from the engine 2 and the EGR cooler 3 into the inflow-side flow path 31 of the flow path switching unit 7 flows to the first outflow-side flow path 32 through the first holes 37 corresponding to the first and second valves 20A and 20B and the through holes 21a of the valve bodies 21. Then, all the cooling water flows from the pump-side outflow port 32a and the oil-cooler-side outflow port 32b of the first outflow-side flow path 32 to the first bypass flow path 16 and the second bypass flow path 17 and flows toward the pump 5 and the oil cooler 8. Thus, since the cooling water does not flow to radiator connection flow path 15, that is, since the cooling water does not flow from the flow path switching unit 7 toward the radiator 6, the cooling water is efficiently warmed by the engine 2 and the EGR cooler 3 while circulating.

Thereafter, when the temperature of the cooling water becomes equal to or higher than the first temperature and lower than the second temperature, the first valve 20A opens, but the second valves 20B are maintained in a closed state, as shown in FIGS. 4 and 5. That is, the valve body 21 of the first valve 20A is positioned on the upper side, and the valve bodies 21 of the second valves 20B are positioned on the lower side.

Therefore, part of the cooling water flowing into the inflow-side flow path 31 of the flow path switching unit 7 sequentially flows into the lower-side flow path portion 34, the connection flow path portion 36, and the upper-side flow path portion 35 of the second outflow-side flow path 33 through the clearance between the valve body 21 and the flange 22 of the first valve 20A. Part of the cooling water flows from the radiator-side outflow port 33a to the radiator connection flow path 15, and flows toward the radiator 6.

The remaining cooling water flowing into the inflow-side flow path 31 flows to the first outflow-side flow path 32 through the first hole 37 corresponding to the second valve 20B and the through hole 21a of the valve body 21, flows from the pump-side outflow port 32a and the oil-cooler-side outflow port 32b to the first bypass flow path 16 and the second bypass flow path 17, and flows toward the pump 5 and the oil cooler 8. In other words, in the state shown in FIGS. 4 and 5, the cooling water flows from the flow path switching unit 7 toward the radiator 6, the pump 5, and the oil cooler 8.

Here, since the number of the first valves 20A is smaller than the number of the second valves 20B, the flow rate of the cooling water flowing from the flow path switching unit 7 to the radiator 6 is smaller than the flow rate of the cooling water flowing through the pump 5 and the oil cooler 8. Thus, even in the state shown in FIGS. 4 and 5, it is possible to efficiently increase the temperature of the cooling water by the engine 2 and the EGR cooler 3.

Thereafter, when the temperature of the cooling water becomes equal to or higher than the second temperature, both of the first valve 20A and the second valves 20B are opened, as shown in FIG. 6. That is, the valve bodies 21 of the first valve 20A and the second valves 20B are positioned on the upper side. Therefore, all the cooling water flowing from the engine 2 and the EGR cooler 3 into the inflow-side flow path 31 of the flow path switching unit 7 sequentially flows to the lower-side flow path portion 34, the connection flow path portion 36 and the upper-side flow path portion 35 of the second outflow-side flow path 33 through a clearance between the valve bodies 21 of the first and second valves 20A and 20B and the flange 22. All of the cooling water flows from the radiator-side outflow port 33a of the second outflow-side flow path 33 to the radiator connection flow path 15 and flows toward the radiator 6. That is, the cooling water does not flow to the first bypass flow path 16 and the second bypass flow path 17, and does not flow toward the pump 5 and the oil cooler 8. As a result, the temperature of the cooling water is prevented from being excessively increased.

TABLE 1

| Temperature of Cooling Water | Position of Valve body 21 of First Valve 20A | Position of Valve bodies 21 of Second Valves 20B | Present of Cooling water | | |
|---|---|---|---|---|---|
| | | | in First Bypass Flow Path 16 | in Second Bypass Flow Path 17 | in Radiator Connection Flow Path 15 |
| Less than First Temperature | Lower side | Lower side | Present | Present | None |
| Equal to or higher than | Upper side | Lower side | Present | Present | Present |

TABLE 1-continued

|  | Position of Valve body 21 of First Valve 20A | Position of Valve bodies 21 of Second Valves 20B | Present of Cooling water | | |
| --- | --- | --- | --- | --- | --- |
| Temperature of Cooling Water |  |  | in First Bypass Flow Path 16 | in Second Bypass Flow Path 17 | in Radiator Connection Flow Path 15 |
| First Temperature to less than Second Temperature |  |  |  |  |  |
| Equal to or higher than Second Temperature | Upper side | Upper side | None | None | Present |

The Table 1 shows the operation of the engine cooling device 4 in the present embodiment described above, specifically, the relationship between the temperature of the cooling water, the positions of the valve bodies 21 of the first and second valves 20A and 20B in accordance with the temperature of the cooling water, and the presence or absence of the flow of the cooling water in the radiator connection flow path 15, the first bypass flow path 16, and the second bypass flow path 17.

As described above, according to the engine cooling device 4 and the engine system 1 of the present embodiment, when the temperature of the cooling water is equal to or higher than the first temperature and lower than the second temperature, part of the cooling water flows from the flow path switching unit 7 to the radiator 6. Therefore, it is possible to lower the pressure of the cooling water. Thus, the pressure of the cooling water at the inlet CFa of the cooling, water of the EGR cooler 3 can be reduced to protect the EGR cooler 3. In other words, it is possible to substantially improve the durability of the EGR cooler 3 in the engine cooling device 4 and the engine system 1.

According to the engine cooling device 4 and the engine system 1 of the present embodiment, the number of the first valves 20A opened at the first temperature is smaller than the number of the second valves 20B opened at the second temperature. Therefore, when the temperature of the cooling water is equal to or higher than the first temperature and lower than the second temperature, the flow rate of the cooling water flowing from the flow path switching unit 7 to the radiator 6 is smaller than the flow rate of the cooling water flowing to the pump 5 and the oil cooler 8. As compared with the case where all the cooling water is flowed to the radiator 6 by opening all the valves 20A and 20B at a low temperature, the engine 2 can be warmed more quickly. That is, it is possible to suppress the warm-up operation time of the engine 2 in a short time.

According to the engine cooling device 4 of the present embodiment, when the temperature of the cooling water is equal to or higher than the first temperature and lower than the second temperature, as shown in FIGS. 4 and 5, the first valve 20A is opened to close part of the first outflow-side flow path 32. However, the first valve 20A is disposed between the second valves 20B in a direction in which the pump-side outflow port 32a and the oil-cooler-side outflow port 32b formed in the first outflow-side flow path 32 of the housing 30 are arranged. Therefore, even when the first valve 20A blocks part of the first outflow-side flow path 32, the cooling water flowing into the first outflow-side flow path 32 through the valve body 21 of each second valve 20B can flow smoothly toward both the pump-side outflow port 32a and the oil-cooler-side outflow port 32b. That is, it is possible to prevent the first valve 20A from hindering the flow of the cooling water toward the pump-side outflow port 32a and the oil-cooler-side outflow port 32b in the first outflow-side flow path 32. Therefore, according to the opening and closing of the first valve 20A, it is possible to suppress or prevent a change in a ratio (flow distribution ratio) between the flow rate of the cooling water flowing toward the pump 5 and the flow rate of the cooling water flowing toward the oil cooler 8.

Also, in the engine cooling device 4 of the present embodiment, the plurality of radiator-side outflow ports 33a are disposed at positions where the distances from the first valve 20A to each of the radiator-side outflow ports 33a are equal to each other in the second outflow-side flow path 33. Therefore, as shown in FIG. 4, in a state where only the first valve 20A is opened, it is possible to suppress or prevent the flow rates of the cooling water flowing from the first valve 20A to the two radiator-side outflow ports 33a from being different from each other in the second outflow-side flow path 33. That is, it is possible to equally flow the cooling water through the two radiator-side outflow ports 33a.

Other Embodiments

Although the embodiment of the present invention has been described above, the present invention is not limited thereto and can be appropriately changed without departing from the technical idea of the present invention.

In the engine cooling device of the present invention, the arrangement of the plurality of valves 20A and 20B may be arbitrary. That is, the valves 20A and 20B are not limited to be arranged in a row in the lateral direction of the housing 30, but may be arranged in the depth direction of the housing 30, for example.

The engine cooling device of the present invention does not have to include, for example, an oil cooler 8 and a second bypass flow path 17.

EXPLANATION OF REFERENCE SIGN

1: Engine System
2: Engine
3: EGR cooler
4: Engine Cooling Device
5: Pump
5a: Suction Port
5b: Discharge Port
6: Radiator
7: Flow Path Switching Unit
8: Oil Cooler
9: Defoaming Tank
15: Radiator Connection Flow Path
16: First Bypass Flow Path
17: Second Bypass Flow Path
20A: First Valve
20B: Second Valve
21: Valve Body
21a: Through Hole 22: Flange
23: Actuator
30: Housing
31: Inflow-side Flow Path
32: First Outflow-side Flow Path
32a: Pump-side Outflow Port
32b: Oil-Cooler-side Outflow Port
33: Second Outflow-side Flow Path
33a: Radiator-side Outflow Port
34: Lower-side Flow Path Portion
35: Upper-side Flow Path Portion
36: Connection Flow Path Portion

The invention claimed is:

1. An engine cooling device comprising:
a pump that supplies a cooling water from a discharge port of the pump to an engine and an EGR cooler;
a radiator that cools the cooling water from the engine and the EGR cooler, an outlet of the cooling water in the radiator being connected to a suction port of the pump;
a flow path switching unit that is provided in a middle of a flow path of the cooling water from the engine and the EGR cooler toward the radiator;
a radiator connection flow path that connects the flow path switching unit and the radiator; and
a first bypass flow path that connects the flow path switching unit and the suction port of the pump;
wherein the flow path switching unit includes:
a first valve that allows the cooling water to flow through the first bypass flow path when a temperature of the cooling water is lower than a first predetermined temperature and allows the cooling water to flow through the radiator connection flow path when the temperature of the cooling water is equal to or higher than the first predetermined temperature; and
a second valve that allows the cooling water to flow through the first bypass flow path when the temperature of the cooling water is lower than a second predetermined temperature that is higher than the first predetermined temperature and allows the cooling water to flow through the radiator connection flow path when the temperature of the cooling water is equal to or higher than the second predetermined temperature,
wherein the number of the first valves is less than the number of the second valves, and
wherein the second valve is disposed on both sides of the first valve in a lateral direction.

2. The engine cooling device according to claim 1
an oil cooler through which the cooling water from the radiator passes, the outlet of the cooling water in the oil cooler being connected to the suction port of the pump; and
a second bypass flow path that connects the flow path switching unit and the oil cooler,
wherein the flow path switching unit includes a housing that accommodates the first valve and the second valves,
wherein an inflow-side flow path in which the cooling water from the engine and the EGR cooler flows, a first outflow-side flow path having a pump-side outflow port to which the first bypass flow path is connected and an oil-cooler-side outflow port that is located at a distance from the pump-side outflow port and to which the second bypass flow path is connected, and a second outflow-side flow path to which the radiator connection flow path is connected and which has a radiator-side outflow port, are formed in an inside portion of the housing,
wherein the first valve communicates the inflow-side flow path with the first outflow-side flow path when the cooling water is lower than the first predetermined temperature, and communicates the inflow-side flow path with the second outflow-side flow path when the cooling water is equal to or higher than the first temperature,
wherein each of the second valves communicates the inflow-side flow path with the first outflow-side flow path when the cooling water is less than the second predetermined temperature, and communicates the inflow-side flow path with the second outflow-side flow path when the cooling water is equal to or higher than the second predetermined temperature, and
wherein the first valve and the second valves are arranged in the direction in which the pump-side outflow port and the oil-cooler-side outflow port are arranged between the pump-side outflow port and the oil-cooler-side outflow port, so as to dispose the first valve between the second valves.

3. The engine cooling device according to claim 2,
wherein the second outflow-side flow path has a plurality of the radiator-side outflow ports, and
wherein the plurality of radiator-side outflow ports are arranged at positions where a distance from the first valve to each of the radiator-side outflow ports is equal to each other in the second outflow-side flow path.

4. An engine system comprising:
an engine;
a EGR cooler;
the engine cooling device according to claim 1.

5. An engine system comprising:
an engine;
a EGR cooler;
the engine cooling device according to claim 2.

6. An engine system comprising:
an engine;
a EGR cooler;
the engine cooling device according to claim 3.

* * * * *